Oct. 20, 1970  J. W. MUELLER  3,534,457
CUTTING INSERT MOUNTING ASSEMBLY
Filed May 2, 1968  2 Sheets-Sheet 1
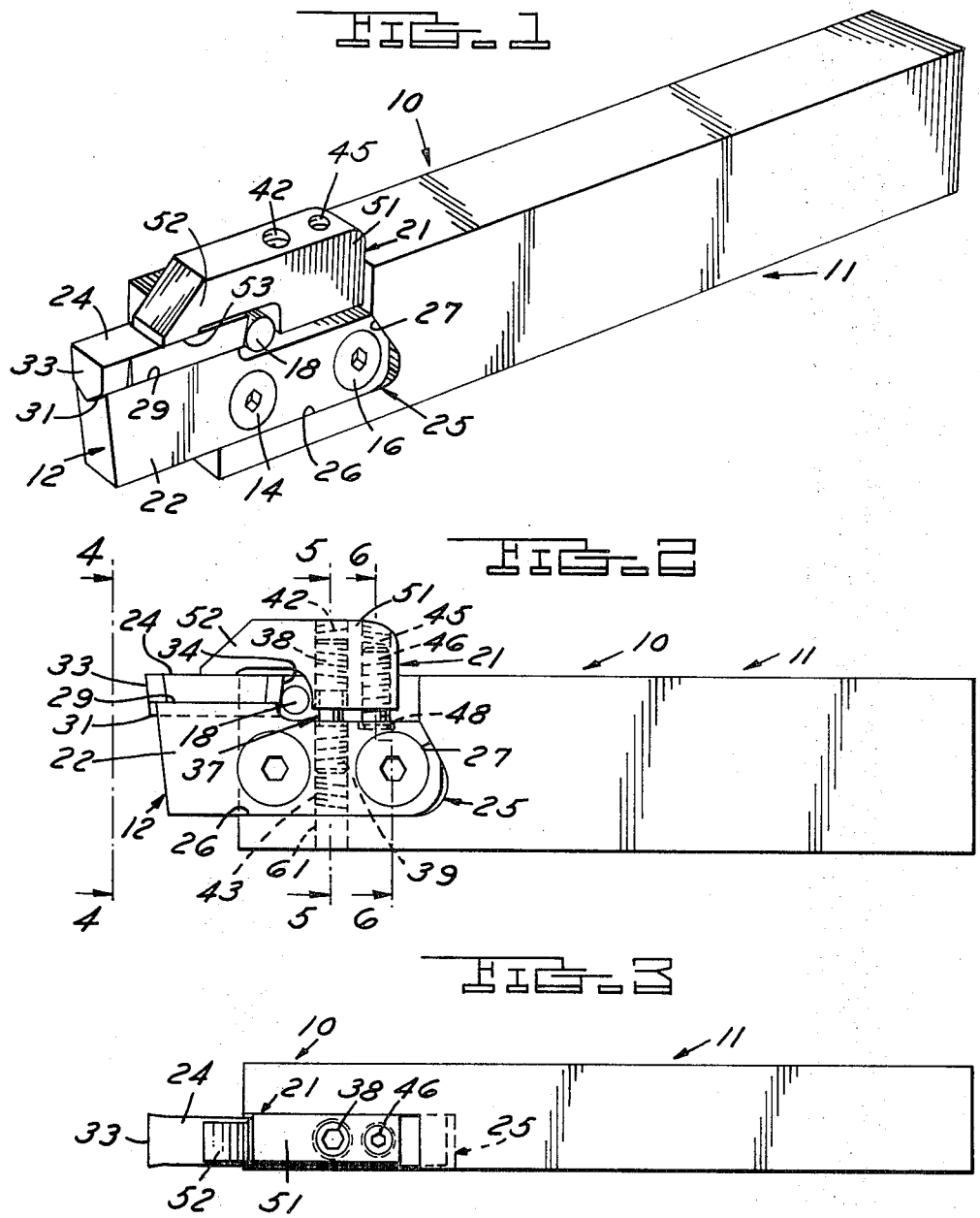
INVENTOR.
JOHN W. MUELLER
BY
Frank B. Hill
ATTORNEY

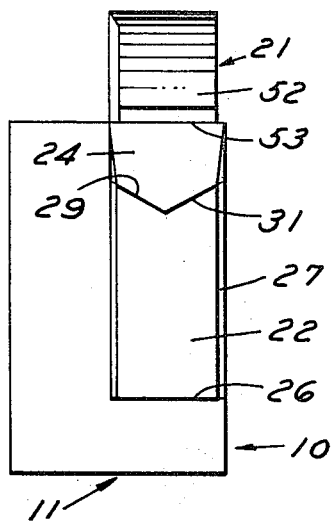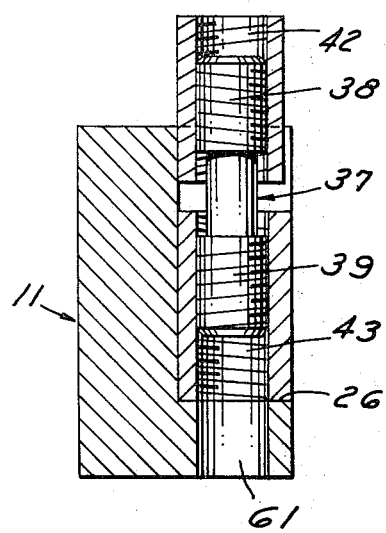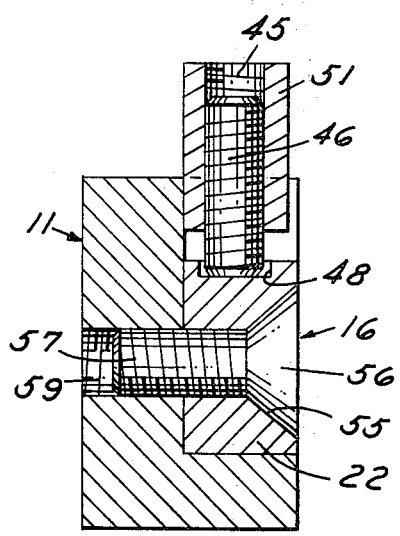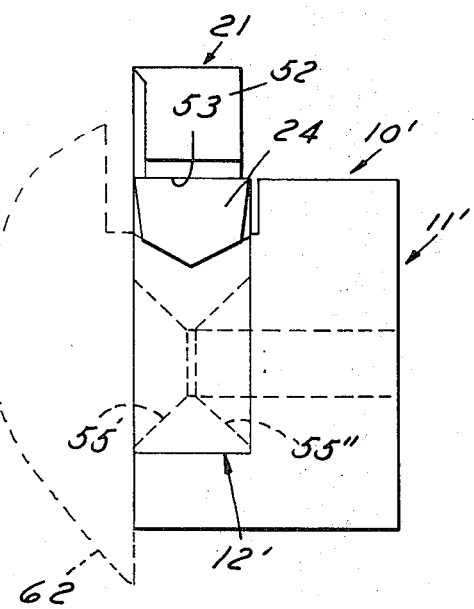

United States Patent Office 3,534,457
Patented Oct. 20, 1970

3,534,457
CUTTING INSERT MOUNTING ASSEMBLY
John W. Mueller, Southfield, Mich., assignor to Willey's Carbide Tool Company, Dearborn, Mich.
Filed May 2, 1968, Ser. No. 725,995
Int. Cl. B26d 1/00
U.S. Cl. 29—96         12 Claims

ABSTRACT OF THE DISCLOSURE

This invention relates to an independent cutting insert mounting assembly for securing a replaceable cutting insert which can be mounted on various machining elements including tool holder shank members. The cutting insert mounting assembly provides for a positive lock and positive release system for clamping the cutting insert in place which is controlled by a double threaded screw member which is in alignment with the cutting insert positioning feature and permits the use of a range of cutting inserts to be used with the mounting assembly.

---

This invention relates generally to an improvement in a cutting tool holder assembly and more particularly to a deep hole groover having a cutting insert mounting assembly which is unitary in structure and can be mounted on a support shank or as a separate item on various mounting means.

The use of various tool holder assembly arrangements having removable and indexable cutting inserts are well known in the art and are commonly used in automatic screw machines, metal lathes and other applications.

Various mounting assembly and shank arrangements have been provided in this art and these arrangements have combined inner relations of the various elements to perform desired machining operations. In a normal embodiment the insert mounting assembly will be positioned in a recess or a pocket in the shank of the tool holder assembly which is adapted to be mounted on a tool post in the machine the tooling is to be used on. The parameters of the tool holder assemblies are normally quite close and when different tooling is required a new tool holder assembly will be used to replace the prior one to provide a different cutting insert. Therefore, a principal object of the present invention is to provide a cutting insert mounting assembly which can be provided for use by mounting it independently on a tool block or mounting it with a tool holder assembly.

Another object of the present invention is to provide a cutting insert having a replaceable and indexable cutting insert held in position in the holder portion of a tool holder assembly by means of a clamp independent of any connection with any tool holder or a tool block or mounting.

Another object of the present invention is to provide a cutting insert tool arrangement having a positive lock and a positive release means to provide easy replacement of the cutting insert.

A further object of the present invention is to provide a locking and release clamping surface which can be released from either the bottom or the top face of a tool holder assembly and the release means does not act with the body of the tool holder assembly.

A still further object of the present invention is to provide clamping means in line with the cutting insert and to provide the cutting insert to be replaced within a limited range of tooling and have the carbide cutting tips replaced without removing the tool holder assembly from the tool post.

To the accomplishment of the foregoing and related ends, the invention, then, consists of the means and features hereinafter fully described and particularly pointed out in the claims, the annexed drawings and the following description setting forth in detail certain means for carrying out the invention, such disclosed means illustrating, however, but some of the various ways in which the principle of the invention may be used.

In the annexed drawings:

FIG. 1 is a perspective view of a tool holder assembly illustrating a cutting insert mounting assembly mounted to the tool holder assembly and illustrating the principles of the present invention.

FIG. 2 is a side elevational view of the tool holder assembly illustrated in FIG. 1 showing the principles of the present invention.

FIG. 3 is a top plan view of the tool holder assembly illustrated in FIGS. 1 and 2 showing the principles of the present invention.

FIG. 4 is a front end view of the tool holder assembly showing the cutting insert positioned in the support plate and illustrating the principles of the present invention and taken generally along and looking in the direction of the arrows of line 4—4 of FIG. 2.

FIG. 5 is a partial sectional view showing the securing clamping means of the cutting insert mounting assembly and taken generally along and looking in the direction of the arrows of line 5—5 of FIG. 2.

FIG. 6 is a partial sectional view illustrating the principles of the present invention showing the locating means of the cutting insert mounting assembly and taken generally along and looking in the direction of the arrows of line 6—6 of FIG. 2.

FIG. 7 is an alternate embodiment illustrating the principles of the present invention showing the cutting insert mounting assembly mounted in the opposite direction and illustrating a dual mounting support plate which can be mounted either on a tool holder assembly or a tool post and from either the left or the right side.

Referring generally to FIG. 1, a tool holder assembly is illustrated using reference number 10. The tool holder assembly 10 is provided with a shank member 11 and a cutting insert mounting assembly 12. The cutting insert mounting assembly 12 is mounted to the shank member 11 by mounting screws 14 and 16; the full purpose and function of these will be explained in more detail below. In the preferred embodiment of the present invention a positioning pin 18 is provided as part of the tool holder assembly and is mounted in the shank member 11 and determines the cutting position of the tool insert mounting assembly 12.

The cutting insert mounting plate 12 is provided with a clamp member 21, a support plate 22 and a cutting insert 24. The shank member 11 which is adapted to normally be mounted on the tool post of a machine and has a portion removed from one end so as to form a recess 25 on one end thereof. The recess 25 is open at the top end on the front as viewed in FIGS. 1 and 2 and presents a support wall 24 along its bottom edge and a rear abutment wall 27 at its back end.

In the preferred embodiment the support plate 22 is longer than the recess 25 so that it projects past the end of the shank member 11, and it is positioned in the recess 25 by mounting screws 14 and 16 so that it makes engagement with the support wall 26 and the rear abutment wall 27 in its preferred embodiment. This arrangement is not required in all embodiments as will become clearer as the description proceeds.

The cutting insert 24 is positioned between the clamp member 21 and the upper edge of support plate 22. The support plate 22 in the preferred embodiment affords a transversely V-shaped concave surface 29 to receive the cutting insert 24. As viewed in the present illustration, the cutting insert 24 is a removeable and indexable cutting insert which can be made of various material, preferably made of carbide or other like material. The cutting insert 24 has a lower surface in the form of a V-shaped convex surface generally indicated by number 31 which conforms to and is engageable with concave seating surface 29 of support plate 22. This arrangement insures proper lateral locating of the cutting insert 24.

The cutting insert 24 has a top surface 32, a cutting face 33 and an end face 34 as best viewed in FIG. 2. The end face 34 will be positioned off the positioning pin 18 to locate the cutting insert 24 in the desired cutting position in the tool holder assembly 10. When the cutting face 33 is to be removed from the cutting position, the cutting insert 24 can be moved from the cutting insert mounting assembly 12 and turned around end for end so that the present cutting face 33 will then become the end face 34 and locate off the positioning pin 18, and the end face 34 will then be located at the cutting position the same as the present cutting face 33, thus giving the cutting insert double life by being easily removed, indexed and positioned.

The clamping member 21 is part of the insert mounting assembly 12 but makes no direct contact with the shank member 11 of the tool holder assembly 10. The support plate 22 is held in a stationary position once the cutting insert mounting assembly 12 is mounted in cutting position by the mounting screws 14 and 16.

The clamping member 21 has a threaded clamping member 37 which is provided with a first threaded portion 38 and a second threaded portion 39. The clamping member 21 is provided with a threaded bore 42 and the cutting insert mounting assembly 12 is provided with a threaded bore 43 which is aligned with the threaded bore 42. The first threaded portion 38 engages the threaded bore 42 and the second threaded portion 39 is engaged with the threaded bore 43. The first threaded portion 38 and the second threaded portion 39 are threaded in opposite directions so that rotation of the threaded member 37 in one direction moves the clamping member 21 towards the support plate 22 and movement in the opposite direction will move the clamping member 21 away from the support plate 22. A locating threaded bore 45 is provided in the clamping member 21 and a threaded locating pin 46 is positioned in the locating threaded bore 45. A locating pocket 48 is provided in the support plate 22 and is substantially aligned with the third threaded bore 45 so that the clamping member 21 and the support plate 23 will be held in substantial alignment when the clamping member 21 is moved toward clamping position.

The clamping member 21 has a body portion 51. The body portion 51 has a lateral off-set clamping head or finger 52 which is provided with a clamping surface 53. The clamping surface 53 acts on the top surface 32 of cutting insert 24 to clamp it in position when the clamping threaded member 37 is turned in the direction to move the clamping member 21 toward the support plate 22. The threaded locating pin 46 will make engagement with the bottom of the locating pocket 48 as the clamping surface 53 is making clamping contact with the top surface 32 of the cutting insert 24. When the contact between the threaded locating pin 46 and the locating pocket 48 is made it will tend to have the clamping surface 53 apply force on the top surface 32 by having the clamping threaded member 33 act as a pivot and the body portion 51 of the clamping member 21 will attempt to move around it in a counter-clockwise direction as viewed in FIG. 2. This arrangement will provide for a range of various cutting inserts 24 to be positioned in the cutting insert mounting assembly 12. The threaded locating pin 46 can be adjusted within the locating threaded bore 45 as the distance between the top surface 32 and the V-shaped convex surface 31 is altered.

As viewed in FIG. 6, the support plate 22 is provided with a wedge cone surface 55 to receive a wedge shaped head member 56 of mounting screw 16. The mounting screw 16 has a threaded end 57 which acts in a threaded mounting bore 59 which is positioned in the shank member 11 of tool holder assembly 10. Mounting screw 14 of the cutting insert mounting assembly 12 will have similar features to the mounting screw 16.

As viewed in FIG. 5, an opening bore 61 is provided in the shank member 11 and is aligned with the threaded bore 43. The opening bore 61 permits turning of the clamping threaded member 37 from the bottom of the tool holder assembly 10. In some applications the tool holder assembly 10 is mounted on a machine post in such a manner that there may be restrictions covering the upper end of the clamping member 21 so that a release and clamp tool cannot be inserted through the threaded bore 42 to either clamp or release the cutting insert 24, unless the tool holder assembly 10 is removed from the tool post. The threaded bore 61 permits access to the clamping threaded member 37 so that access may be made to reverse or replace the cutting insert 24 on the cutting insert mounting assembly 12 in many applications without removing the tool holder assembly 10 from its machining position.

Referring generally to FIG. 7, there is illustrated a tool holder assembly 10' having a shank member 11' with the cutting insert mounting assembly 12' which is mounted on the left side of the shank member 11'. The cutting insert mounting assembly 12' has illustrated in phantom a wedge cone surface 55' which the mounting screw could be positioned to act within mounting the cutting insert mounting assembly 12' to the shank member 11'. Also provided is a wedge cone surface 55'' which is part of the support plate 22 and is aligned with the wedge surface 55'. This permits the support plate to be mounted universally from either the right or left of the member it is to be mounted with. Shown in phantom is a mounting member 62 illustrating that the cutting insert mounting assembly 12' could be mounted on any surface such as directly on the tool post without requiring the use of a shank member. This is permitted because the clamping means in the form of clamping member 21 of the present invention does not act directly with the shank member. The clamping member 21 also provides superior clamping features because it permits a range of cutting inserts to be utilized, if desired, and it has positive clamping and positive release and it is clamped in line with the V-shaped positioning members provided by the support plate and the cutting insert. The positioning pin, for example, could be mounted and become part of the support plate 22 if the cutting insert mounting assembly 12 is to be provided without a shank member 11.

While a preferred embodiment of the invention has been illustrated and described in detail herein, it should be understood that minor modifications may be made in the construction and still be within the spirit and scope of the invention as herein defined and illustrated. It is further to be noted that while directional terms have been used, the same are not to be construed as limitations on the invention since such use has been availed upon only to describe the invention as illustrated.

Other modes of applying the principles of my invention may be employed, instead of those explained, change being made as regards the detailed description as herein disclosed, provided the features stated be any of the following claims or the equivalent of such stated features be employed.

I therefore particularly point out and distinctively claim as my invention:

1. A tool holder assembly having a cutting insert mounting assembly comprising in combination:
  (a) a shank member;
  (b) securing means to mount said cutting insert mounting assembly to said shank member;
  (c) a support plate as part of said cutting insert mounting assembly;
  (d) a clamp member;

(e) locking means connecting said clamp member to said support plate;
(f) a removable cutting insert located between the said clamp member and said support plate;
(g) locating means in said support plate to position said removable cutting insert;
(h) said locking means aligned with said locating means;
(i) a positioning pin secured in said shank member; and
(j) said removable cutting insert positioned on said positioning pin to be located at a cutting position.

2. A tool holder assembly as defined in claim 1, including in combination:
(a) said removeable cutting insert having a V-shaped convex bottom surface;
(b) said locating means on said support plate including a V-shaped concave top surface; and
(c) said V-shaped concave top surface acting on said V-shaped convex bottom surface to laterally position said removeable cutting insert.

3. A tool holder assembly as defined in claim 2, including in combination:
(a) said locking means including a clamping threaded member having first and second threaded portions;
(b) a first threaded bore positioned in said clamp member and a second threaded bore provided in said support plate and aligned with said first threaded bore;
(c) said first threaded portion positioned in said first threaded bore and said second threaded portion positioned in said second threaded bore;
(d) said first and second threaded portions having opposite hand threads;
(e) said clamping member having a clamping surface to act on said removeable cutting insert;
(f) when said clamping threaded member is turned in one direction, said clamping surface will be positively moved to act on said cutting insert to secure the location of said V-shaped convex bottom surface into locating engagement with said V-shaped concave top surface; and
(g) when said clamping threaded member is turned in the opposite direction, said clamping surface is positively removed from said cutting insert.

4. A tool holder assembly having a cutting insert mounting assembly comprising in combination:
(a) a shank member;
(b) securing means to mount said cutting insert mounting assembly to said shank member;
(c) a support plate as part of said cutting insert mounting assembly;
(d) a clamp member;
(e) locking means connecting said clamp member to said support plate;
(f) a removable cutting insert located between the said clamp member and said support plate;
(g) locating means in said support plate to position said removable cutting insert;
(h) said locking means aligned with said locating means;
(i) said removable cutting insert having a V-shaped convex bottom surface;
(j) said locating means on said support plate including a V-shaped concave top surface;
(k) said V-shaped concave top surface acting on said V-shaped convex bottom surface to laterally position said removable cutting insert;
(l) a positioning pin as part of said cutting insert mounting assembly to longitudinally position said removable cutting insert;
(m) said locking means including a clamping threaded member having first and second threaded portions;
(n) a first threaded bore positioned in said clamp member and a second threaded bore provided in said support plate and aligned with said first threaded bore;
(o) said first threaded portion positioned in said first threaded bore and said second threaded portion positioned in said second threaded bore;
(p) said first and second threaded portions having opposite hand threads;
(q) said clamping member having a clamping surface to act on said removable cutting insert;
(r) when said clamping threaded member is turned in one direction, said clamping surface will be positively moved to act on said cutting insert to secure the location of said V-shaped convex bottom surface into locating engagement with said V-shaped concave top surface;
(s) when said clamping threaded member is turned in the opposite direction, said clamping surface is positively removed from said cutting insert;
(t) a third threaded bore provided in said clamp member;
(u) said third bore being substantially parallel to said first threaded bore and on the opposite side from said clamping surface;
(v) a locating pocket provided in said support plate and substantially aligned with said third threaded bore;
(w) a threaded locating pin positioned in said third threaded bore; and
(x) one end of said threaded locating pin acting in said locating pocket when said clamping surface is acting on said removable cutting insert.

5. A tool holder assembly as defined in claim 4, including in combination:
(a) said first threaded bore substantially aligned with the V-shaped convex bottom surface of said removeable cutting insert.

6. A tool holder assembly as defined in claim 4, including in combination:
(a) said securing means including at least two mounting screws;
(b) said mounting screws having threaded ends;
(c) said shank member having threaded bores to receive said threaded ends;
(d) said mounting screws having head members; and
(e) said support plate having head receiving surfaces to receive said head members.

7. A tool holder assembly as defined in claim 6, including in combination:
(a) said support plate having matching aligned head receiving surfaces on both of its sides.

8. A tool holder assembly having a shank member and a cutting insert mounting assembly, comprising in combination:
(a) a recess in one end of said shank member, said recess having a rear abutment wall, a bottom support wall and a side support wall;
(b) at least one mounting screw securing said cutting insert mounting assembly in said recess;
(c) a support plate as part of said cutting insert mounting assembly;
(d) said support plate acted on by said mounting screw to position it against said side support wall;
(e) said support plate supported by said bottom support wall and acted upon by said rear abutment wall;
(f) a clamp member as part of said cutting insert mounting assembly;
(g) locking means connecting said clamp member to said support plate;
(h) a cutting insert located between said clamp member and said support plate;
(i) said cutting insert having a V-shaped convex bottom surface;
(j) said support plate having a V-shaped concave top surface;

(k) said V-shaped concave top surface acting on said V-shaped convex bottom surface to laterally position said cutting insert;
(l) said locking means including a threaded member having first and second threaded portions with opposite hand threads;
(m) a first threaded bore positioned in said clamp member and a second threaded bore positioned in said support plate and substantially aligned with each other;
(n) said first threaded portion positioned in said first threaded bore and said second threaded portion positioned in said second threaded bore; and
(o) a clamping surface as part of said clamping member to move toward and act on said cutting insert when said threaded member is rotated in one direction and to move away from said cutting insert when turned in the opposite direction.

9. A tool holder assembly having a shank member and a cutting insert mounting assembly, comprising in combination:
  (a) a recess in one end of said shank member, said recess having a rear abutment wall, a bottom support wall and a side support wall;
  (b) at least one mounting screw securing said cutting insert mounting assembly in said recess;
  (c) a support plate as part of said cutting insert mounting assembly;
  (d) said support plate acted on by said mounting screw to position it against said side support wall;
  (e) said support plate supported by said bottom support wall and acted upon by said rear abutment wall;
  (f) a clamp member as part of said cutting insert mounting assembly;
  (g) locking means connecting said clamp member to said support plate;
  (h) a cutting insert located between said clamp member and said support plate;
  (i) said cutting insert having a V-shaped convex bottom surface;
  (j) said support plate having a V-shaped concave top surface;
  (k) said V-shaped concave top surface acting on said V-shaped convex bottom surface to laterally position said cutting insert;
  (l) said locking means including a threaded member having first and second threaded portions with opposite hand threads;
  (m) a first threaded bore positioned in said clamp member and a second threaded bore positioned in said support plate and substantially aligned with each other;
  (n) said first threaded portion positioned in said first threaded bore and said second threaded portion positioned in said second threaded bore;
  (o) a clamping surface as part of said clamping member to move toward and act on said cutting insert when said threaded member is rotated in one direction and to move away from said cutting insert when turned in the opposite direction;
  (p) a third threaded bore provided in said clamp member substantially parallel to said first threaded bore;
  (q) said first threaded bore is positioned between said third threaded bore and said clamping surface;
  (r) a locating pocket provided in said support plate and substantially aligned with said third threaded bore;
  (s) a threaded locating pin positioned in said threaded bore; and
  (t) one end of said threaded locating pin acting in said locating pocket when said clamping surface is acting on said cutting insert.

10. A tool holder assembly as defined in claim 9, including in combination:
  (a) said threaded member substantially aligned with the V-shaped convex bottom surface of said cutting insert.

11. A tool holder assembly as defined in claim 10, including in combination:
  (a) said mounting screw having a threaded end;
  (b) said shank member having a threaded bore to receive said threaded end;
  (c) said mounting screws having head members; and
  (d) said support plate having head receiving surfaces to receive said head members.

12. A tool holder assembly as defined in claim 11, including in combination:
  (a) said support plate having matching aligned head receiving surfaces on both of its sides.

References Cited
UNITED STATES PATENTS

| | | | |
|---|---|---|---|
| 2,808,638 | 10/1957 | Filippi | 29—96 |
| 2,949,662 | 8/1960 | Cook et al. | 29—96 |
| 2,964,833 | 12/1960 | Novkov | 29—95 |
| 2,999,301 | 9/1961 | Conti | 29—96 |
| 3,125,798 | 3/1964 | Stein | 29—98 |
| 3,158,921 | 12/1964 | Yost | 29—96 |
| 3,205,558 | 9/1965 | Stier | 29—96 |
| 3,220,089 | 11/1965 | Hammers | 29—96 |

FOREIGN PATENTS 989,133  4/1965  Great Britain.

HARRISON L. HINSON, Primary Examiner